United States Patent [19]

Schock

[11] Patent Number: 4,864,768

[45] Date of Patent: Sep. 12, 1989

[54] FISHING STRIKE-REACTIVE DIVING AND SURFACING TUBE PLANER

[76] Inventor: Herold Schock, 509-825 Granville St., Vancouver, B.C. V6Z 1K9, Canada, V6Z 1K9

[21] Appl. No.: 234,532

[22] Filed: Aug. 22, 1988

[51] Int. Cl.$^4$ ............................................. A01K 91/04
[52] U.S. Cl. ................................................. 43/43.13
[58] Field of Search ................. 43/42.06, 43.12, 43.13, 43/43.14, 43.15, 42.39

[56] References Cited

U.S. PATENT DOCUMENTS

| | | | |
|---|---|---|---|
| 1,611,644 | 12/1926 | Johnson | 43/42.48 |
| 2,731,755 | 1/1956 | Ward et al. | 43/43.13 |
| 3,068,606 | 12/1962 | Hopkins | 43/43.13 |
| 3,755,955 | 9/1973 | Saia | 43/43.13 |
| 4,231,179 | 11/1980 | Hillesland | 43/43.13 |

*Primary Examiner*—M. Jordan

[57] ABSTRACT

In fishing tackle depth planers, it is common to have a device that planes downward in the water until a fish's strike trips a release mechanism, at which time the planer assumes a non-diving orientation and is more easily retrieved up through the water. A device is provided that not only dives in a pre-release, trolling orientation, but also actively planes toward the surface after the release when the device is pulled backward by a fish away from the fisherman. The device accomplishes this with a tubular construction and means for connecting both the leading and trailing fishing lines in correct positions on the device to achieve the desired effects in the water.

12 Claims, 1 Drawing Sheet

FISHING STRIKE-REACTIVE DIVING AND SURFACING TUBE PLANER

FIELD OF THE INVENTION

The present invention relates to fishing tackle and in particular to depth planers and divers having release mechanisms. The purpose of the release mechanism is to allow such a device to assume a non-diving orientation in the water upon a fish exerting sufficient force on the fishing line to which the device is attached. This enables an easier retrieval of the fishing line.

In fishing, flat planers or curved divers are used to take a trolling line down to an appropriate depth. The planer or diver is attached to the fishing line in such a way that it tends to slice downward through the water upon the fishing vessel moving forward. The device is usually designed to be tripped into a non-diving orientation by a release mechanism in response to a strike by a fish. Due to the speed of the trolling vessel and limitations on the weight that can be efficaciously affixed to the fishing line itself, the line would not sink as deep without the use of the planer or diver.

The use of the release mechanism allows the strike to be detected by the fisherman and allows the fishing line to be retrieved with less resistance.

The release mechanism is constructed so as to retain the planer in its diving orientation under normal trolling resistance, but so as to trip the planer when the force on the end of the fishing line exceeds some threshold. The fisherman can then attempt to reel in the fish or other object that may have caused the extra force.

DESCRIPTION OF THE PRIOR TECHNOLOGY

A number of depth planers having release features have been patented. An example of a depth planer with a tripping release mechanism is shown in U.S. Pat. No. 3,643,370, It has an adjustable tension means relating to the release threshold, and a weight to assist in the sinking action and to correctly balance the planer in its diving orientation. Another depth control device for trolling, shown in U.S. Pat. No. 3,583,089, has a release mechanism and a channel-shaped body with a base and two sides.

None of the previously available or disclosed technology shows the features that comprise this invention.

SUMMARY OF THE PRESENT INVENTION

This invention provides a diving tube for submerging a fishing line from a trolling vessel. In a preferred embodiment, the device comprises a tubular body with a sloped leading rim, a chain attached at one end to the base of the body near its leading rim and attached at the other end to a ball, which is fitted into a complementary socket on the top of the leading rim of the tubular body. The fishing line from the fisherman's rod is attached by a swivel snap to the chain adjacent to the ball. When the ball is in the socket, the trolling fishing line causes the tube to dive down into the water. A weight is rivetted onto the bottom of the leading rim of the tube, to keep the tube in its correct orientation in the water. A fishing line to the lure or bait and hook is attached to the middle of a chain bolted across the tailing rim of the diving tube approximately three-quarters of the way down from the top of the tube to the bottom.

When a fish strikes the lure the tailing line pulls the tube and the socket away from the ball. This trips the tube into a non-diving orientation, and allows the tube and other tackle to be retrieved without the diving resistance from the tube. The trailing rim of the tube is sloped with respect to the length of the tube. The trailing rim is substantially parallel to the leading rim. If the fish on the line swims away from the fisherman when the tube is in its non-diving orientation, the shape of the tube and the position of the tailing fishing line will cause the tube to tend to approach the surface of the water. The weight continues to act as a stabilizer to keep the tube in its correct orientation as the tube planes toward the surface of the water.

The sloped parallel rims and tubular aspect of the device thus make the tube reversible in its effect; when it is pulled forward with the ball in the socket, it dives, and when it is pulled backward by the fish, it surfaces.

The planing effect in either direction is enhanced by wings mounted on the tube as shown in the drawings.

The tension required to trigger the release can be adjusted by means of a screw and bore through flanges integral to the socket that holds the ball.

DETAILED DESCRIPTION

Figure 1:
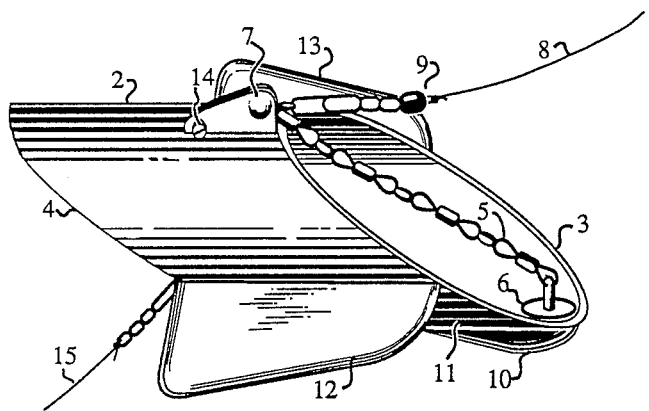
FIG. 1 is a side perspective of a preferred embodiment of the tubular planer of this invention.

Referring to FIG. 1, the tube 2 has a sloped leading rim 3 and a parallel trailing rim 4. A chain 5 is affixed adjacent to the leading rim 3 to the inner bottom 6 of the tube 2, and is detachably connected to the socket 7. The fishing line 8 is attached by means of snap swivel 9 to the chain 5 near its connection to the socket 7.

Different depths can be obtained by use of the device by attaching the snap swivel at different positions on the chain. The higher the position, i.e. the closer to the socket, the greater will be the downward diving effect of the device when it is pulled through the water by the fishing line 8. A sleek weight 10 is rivetted to the outside bottom 11 of the device adjacent to the leading rim. This ballast keeps the device from spinning into an upsidedown position in the water and keeps it in an orientation such that the intended diving or surfacing effect of the device is maintained. The wings 12 and 13 help to keep the device stable in its correct orientation as it is pulled through the water. The screw 14 can adjust the retaining tension of the socket 7. The fishing line 1 to the lure or bait is shown trailing the device.

Figure 2:
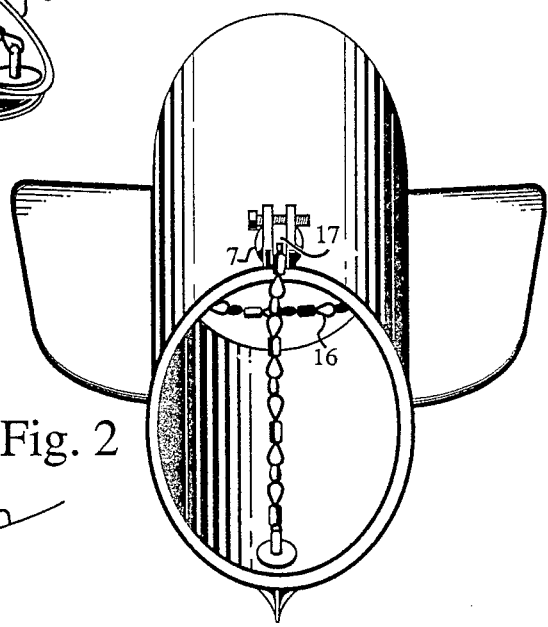
FIG. 2 is a front perspective of the device of FIG. 1.

Referring to FIG. 2, the rear chain 16 enables the fishing line to the lure or bait to be attached in a position on the horizontal center of the device while having its vertical position approximately three-quarters of the way down the height of the tube. The horizontal central position of attachment keeps the device from planing to one side or the oher. If a planing to one side is desired, for example when trolling with two sets of tackle at the same depth, the sets of tackle can be prevented from tangling with each other by attaching the respective trailing fishing lines to the respective rear chains at opposite off-center positions such that the respective diving tubes tend to plane away from each other. The ball 17 snaps into the socket 7 to keep the device in its diving orientation.

Figure 3:
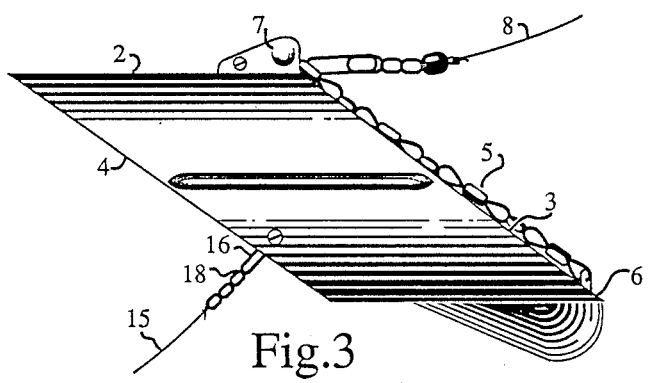
FIG. 3 is a side view of the device of FIG. 1.

Referring to FIG. 3, the tube 2 has a leading rim 3 that is at an acute angle with respect to the bottom length of the tube and that is at an oblique angle with respect to the top length of the tube. The tube's aft rim 4 is substantially parallel to the leading rim 3. When a fish strikes the lure, the force pulls the ball from the socket 7, changing the position of the pulling force of the fishing line 8 from the point of attachment of the snap swivel near the socket to the point of affixation of the chain 5 to the inner bottom 6 of the tube 2 adjacent to the leading rim 3. In that orientation, a pulling force from the rod will retrieve the tackle with little resistance from the device. On the other end of the tackle, if the fish pulls away with the line, the point 18 of connection of the rear chain 16 to the fishing line 15 to the lure or bait will cause the tube 2 to plane toward the surface of the water.

Figure 4:
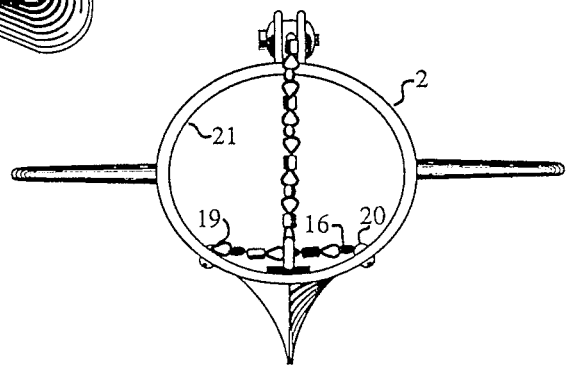
FIG. 4 is a front view of the device of FIG. 1.

Referring to FIG. 4, the rear chain 16 is bolted to each side of the tube 2 at 19 and 20 respectively. The tube is most effective in diving and surfacing if it is oval-shaped, the interior 21 being wider than it is high.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A planing device for fishing tackle comprising a tube having;
   (a) a weighted bottom;
   (b) a release mechanism adjacent to the top of the leading rim of the tube;
   (c) leader connecting means affixed at one point to the bottom of the tube adjacent to the leading rim of the tube and adapted at another point to be releasably attached to the release mechanism and adapted between the said points but closer to the said other point to have a leading fishing line attached thereto;
   (d) lure line connecting means affixed adjacent to the trailing rim of the tube and adapted to have a trailing fishing line attached thereto.

2. The device of claim 1, in which the leading rim of the tube is at an acute angle with respect to the bottom length of the tube and is at an oblique angle with respect to the top length of the tube.

3. The device of claim 1, in which the leading rim of the tube is at an acute angle with respect to the bottom length of the tube and is at an oblique angle with respect to the top length of the tube, and the trailing rim of the tube is at an oblique angle with respect to the bottom length of the tube and is at an acute angle with respect to the top length of the tube.

4. The device of claim 1, in which the tube has an interior cross-section that is substantially oval, having a width of greater dimension than its height.

5. The device of claim 1, in which the release mechanism comprises a socket mounted on the tube and adapted to receive a ball affixed to the leader connecting means.

6. The device of claim 1, in which the leader connecting means is a chain.

7. The device of claim 1, in which the lure line connecting means is a chain.

8. The device of claim 1, in which the lure line connecting means is affixed on each side of the tube approximately three-quarters of the way down from the top length of the tube to the bottom of the tube.

9. The device of claim 1, in which there are additionally two stabilizer wings, each mounted along a side of the tube.

10. The device of claim 1, in which the weighted bottom of the tube comprises a sleek-shaped lead weight that is rivetted to the bottom of the tube adjacent to the leading rim of the tube.

11. The device of claim 1, in which the release mechanism has a screw that adjusts the threshold force required to release an object of attachment on the leader connecting means from the release mechanism.

12. A planing device for fishing tackle comprising a tube, having a substantially oval interior cross-section, with a width of greater dimension than its height, in which the leading rim of the tube is at an acute angle with respect to the bottom length of the tube and is at an oblique angle with respect to the top length of the tube, and the trailing rim of the tube is at an oblique angle with respect to the bottom length of the tube and is at an acute angle with respect to the top length of the tube, and further comprising:
   (a) a sleek-shaped lead weight that is rivetted to the bottom of the tube adjacent to the leading rim of the tube;
   (b) a socket mounted on the top of the tube adjacent to the leading rim of the tube and adapted to receive a ball affixed to a leader chain, the socket being adjustable in size by means of a screw set in one flange integral to one side of the socket and threaded into another flange integral to the other side of the socket;
   (c) the said leader chain, affixed at one point to the bottom of the tube adjacent to the leading rim of the tube and adapted to have a leading fishing line attached at any of a variety of points thereon;
   (d) a lure line chain affixed adjacent to the trailing rim of the tube on each side of the tube approximately threequarters of the way down from the top length of the tube to the bottom length of the tube, the said lure line chain adapted to have a trailing fishing line attached thereto;
   (e) two stabilizer wings, each mounted along a side of the tube.

* * * * *